US012264817B1

(12) United States Patent
Chang et al.

(10) Patent No.: US 12,264,817 B1
(45) Date of Patent: Apr. 1, 2025

(54) MANUFACTURING METHOD OF OPTICAL DEVICE, OPTICAL DEVICE WITH QUANTUM DOTS, AND ILLUMINATION APPARATUS WITH QUANTUM DOTS

(71) Applicant: QDLUX INC., Hsinchu (TW)

(72) Inventors: Jung-Hua Chang, Hsinchu (TW); Ching-Liang Yi, Hsinchu (TW); Chen-Yang Huang, Hsinchu (TW)

(73) Assignee: QDLUX INC., Hsinchu (TW)

( * ) Notice: Subject to any disclaimer, the term of this patent is extended or adjusted under 35 U.S.C. 154(b) by 0 days.

(21) Appl. No.: 18/414,010

(22) Filed: Jan. 16, 2024

(51) Int. Cl.
*F21V 9/30* (2018.01)
*F21Y 115/10* (2016.01)

(52) U.S. Cl.
CPC ............ *F21V 9/30* (2018.02); *F21Y 2115/10* (2016.08)

(58) Field of Classification Search
CPC ........................................................ F21V 9/30
See application file for complete search history.

(56) References Cited

U.S. PATENT DOCUMENTS

2013/0256711 A1* 10/2013 Joo ........................ H01L 33/60 438/28
2014/0009959 A1* 1/2014 Park ................. G02F 1/133617 362/559
2017/0345977 A1* 11/2017 Goeoetz ................ H01L 33/505
2018/0198031 A1* 7/2018 Kim ........................ H01L 33/54
2019/0081218 A1* 3/2019 Dawson-Elli ......... H01L 33/005
2019/0296196 A1* 9/2019 Oh ........................ H01L 33/641
2021/0135064 A1* 5/2021 Ishio ................... H01L 33/0095
2022/0059606 A1* 2/2022 Huang .................... H01L 33/44

* cited by examiner

*Primary Examiner* — Eric T Eide

(74) *Attorney, Agent, or Firm* — Chun-Ming Shih; HDLS IPR SERVICES

(57) ABSTRACT

A manufacturing method of an optical device includes: providing a lower transparent substrate; wherein the lower transparent substrate includes an upper surface; providing a quantum dot film element and a glue-material enclosure wall disposed on the upper surface; wherein the glue-material enclosure wall surrounds the quantum dot film element; providing an upper transparent substrate covering the quantum dot film element and the glue-material enclosure wall, such that the quantum dot film element and the glue-material enclosure wall are sandwiched between the lower transparent substrate and the upper transparent substrate; and cutting the lower transparent substrate and the upper transparent substrate to form a lower protective film and an upper protective film corresponding to the quantum dot film element, so as to obtain the optical device including the lower protective film, the upper protective film, the quantum dot film element, and the glue-material enclosure wall.

12 Claims, 8 Drawing Sheets

MANUFACTURING METHOD OF OPTICAL DEVICE, OPTICAL DEVICE WITH QUANTUM DOTS, AND ILLUMINATION APPARATUS WITH QUANTUM DOTS

BACKGROUND

Technical Field

This disclosure relates to an illumination apparatus with quantum dots, and in particular to, a manufacturing method of an optical device, an optical device with quantum dots, and an illumination apparatus with quantum dots.

Related Art

Quantum dots are excited by incident light to generate an excitation light. Therefore, quantum dots are typically used to convert the wavelength of light-emitting diodes, such that a light emission spectrum of a light-emitting apparatus is not limited to the inherent light emission spectrum of the light-emitting diodes, thus achieving a required light emission effect. The current application of quantum dots is to add semiconductor nanoparticles into a base material of a carrier substrate and to directly cover a light-emitting diode chip with the carrier substrate, so as to form a quantum dot film. Lights emitted from the light-emitting diode chip pass through the quantum dot film, exciting the quantum dots to generate excitation lights.

Direct contact between the quantum dot film and the surface of the light-emitting diode chip is likely to cause quick degradation of the carrier substrate. In addition, the carrier substrate of the quantum dot film is directly exposed to air, coming into contact with oxygen and water vapor, which is also likely to cause degradation of the carrier substrate. The two factors both lead to rapid degradation of the quantum dot film, thereby impacting the service life of a light-emitting diode apparatus.

In the related art, the quantum dot film element is arrayed between two glass substrates, and then the glass substrates are cut using a water jet or laser, to obtain a plurality of quantum dot film elements with the top surface and the bottom surface covered by the glass substrates. However, such design has two deflects. First, only the top surface and the bottom surface of the quantum dot film element are covered and protected by the glass substrates, which can only isolate the high temperature of the light-emitting diode chip and protect against impacts from above at most. The side surface of the quantum dot film element is still exposed to the air. Second, during cutting, the side surface of the quantum dot film element is prone to damage from water jet impacts or early degradation due to the high temperature of laser, impacting the production yield and service life of the quantum dot film element.

SUMMARY

In view of the foregoing technical problem, this disclosure provides a manufacturing method of an optical device, an optical device with quantum dots, and an illumination apparatus with quantum dots for increasing the service life of the quantum dot film element.

This disclosure provides a manufacturing method of an optical device, including: providing a lower transparent substrate; wherein the lower transparent substrate includes an upper surface; providing a quantum dot film element and a glue-material enclosure wall disposed on the upper surface; wherein the glue-material enclosure wall surrounds the quantum dot film element; providing an upper transparent substrate covering the quantum dot film element and the glue-material enclosure wall, such that the quantum dot film element and the glue-material enclosure wall are sandwiched between the lower transparent substrate and the upper transparent substrate; and cutting the lower transparent substrate and the upper transparent substrate to form a lower protective film and an upper protective film corresponding to the quantum dot film element, so as to obtain the optical device including the lower protective film, the upper protective film, the quantum dot film element, and the glue-material enclosure wall.

This disclosure further provides an optical device with quantum dots, including a lower protective film, a quantum dot film element, and an upper protective film. The quantum dot film element is disposed on the lower protective film. The glue-material enclosure wall is disposed on the lower protective film. The glue-material enclosure wall surrounds the quantum dot film element and covers a side surface of the quantum dot film element. The upper protective film covers the quantum dot film element and the glue-material enclosure wall, such that the quantum dot film element and the glue-material enclosure wall are sandwiched between the lower protective film and the upper protective film.

This disclosure further provides an illumination apparatus with quantum dots, including a light-emitting diode unit that includes at least one light-emitting diode chip; and the optical device with quantum dots as described above. The light-emitting diode unit includes at least one light-emitting diode chip. The optical device with quantum dots is disposed on the light-emitting diode unit.

According to the manufacturing method of an optical device, the optical device with quantum dots, and the illumination apparatus with quantum dots provided by this disclosure, the quantum dot film element is completely covered between the upper protective film, the lower protective film, and the glue-material enclosure wall. The quantum dot film element is isolated from the external air and not prone to adverse effect during cutting, slowing down the material degradation of the quantum dot film element, thus increasing the service life of the optical device with quantum dots. In addition, the manufacturing method provided by this disclosure allows for the mass production of the optical device and the light-emitting apparatus, maintaining the required production capacity.

BRIEF DESCRIPTION OF THE DRAWINGS

This disclosure will become more fully understood from the detailed description given herein below for illustration only, and thus not limitative of this disclosure; wherein.

DETAILED DESCRIPTION

Figure 1:
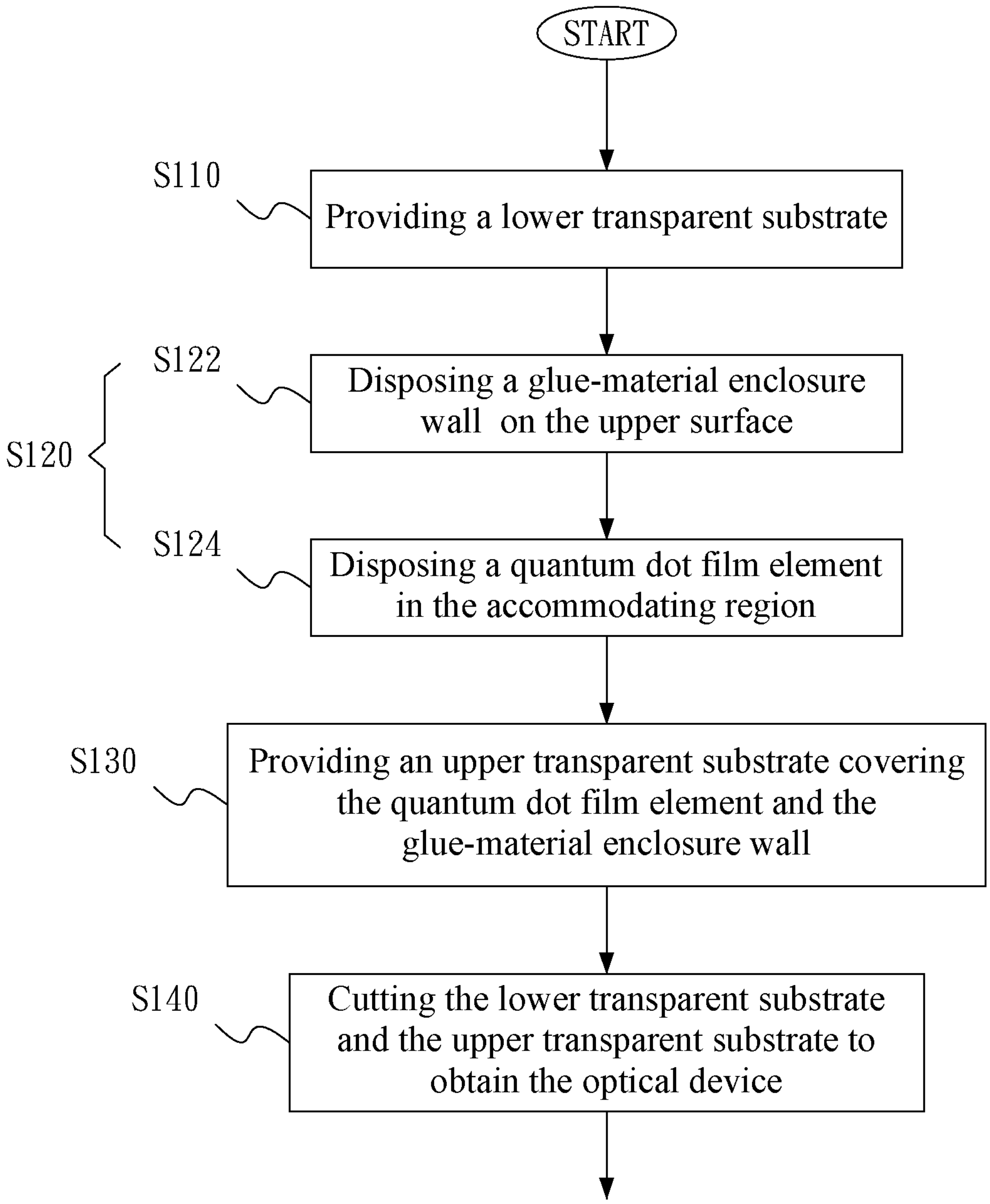
FIG. 1 is a flowchart of a manufacturing method of an optical device according to an embodiment of this disclosure.

Referring to FIG. 1, which shows a manufacturing method of an optical device 100 with quantum dots according to an embodiment of this disclosure.

Figure 2:
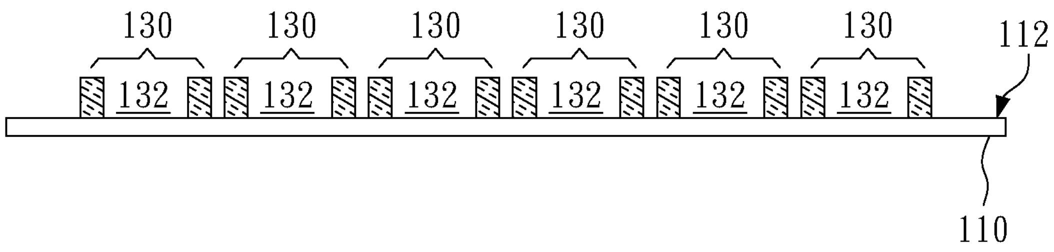
FIG. 2 is a schematic sectional view of a semi-finished product of an optical device according to an embodiment of this disclosure, disclosing a carrier substrate and a glue-material enclosure wall.
Figure 3:
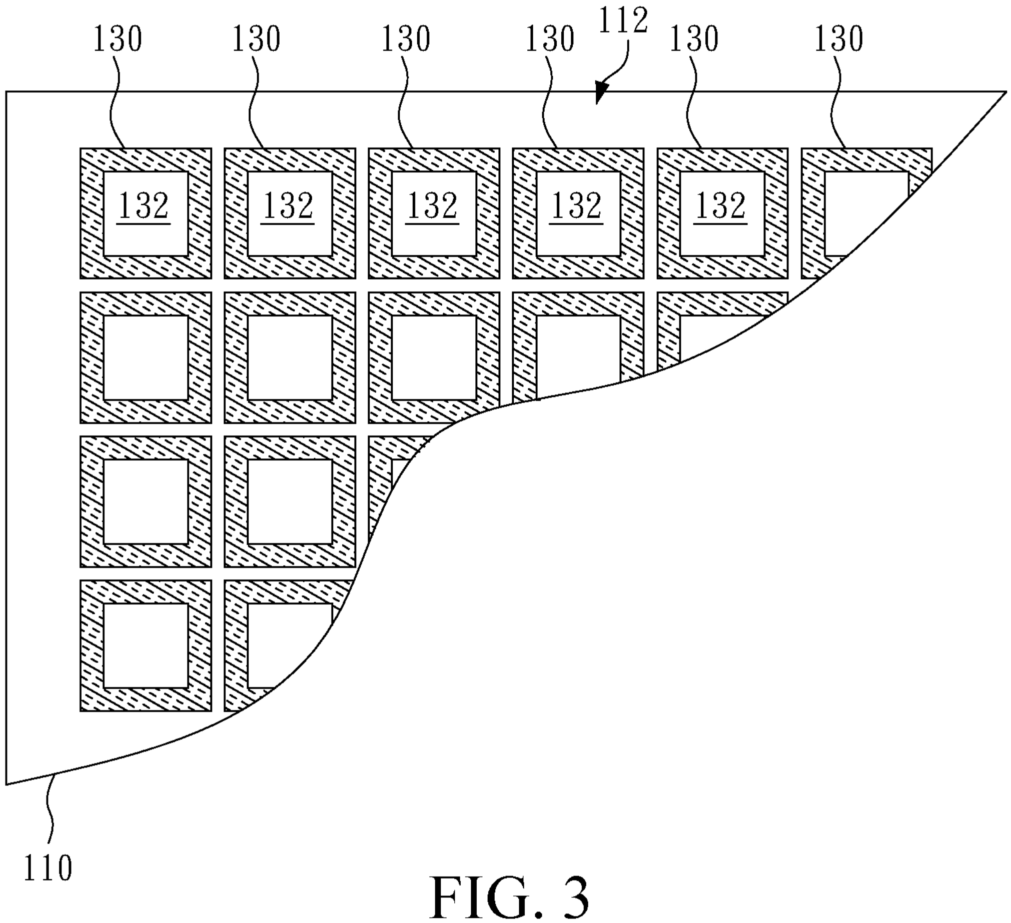
FIG. 3 is a top view of a semi-finished product of an optical device according to an embodiment of this disclosure, disclosing a lower transparent substrate and a glue-material enclosure wall.

As shown in FIG. 1, FIG. 2, and FIG. 3, the method is to provide a lower transparent substrate 110, as shown in step S110. The lower transparent substrate 110 includes an upper surface 112. Specifically, the lower transparent substrate 110 may be a glass substrate.

Figure 4:
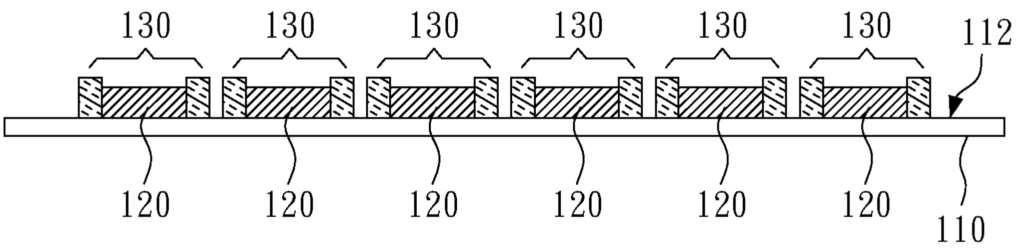
FIG. 4 is a schematic sectional view of a semi-finished product of an optical device according to an embodiment of this disclosure, disclosing a lower transparent substrate, a glue-material enclosure wall, and a quantum dot film element.
Figure 5:
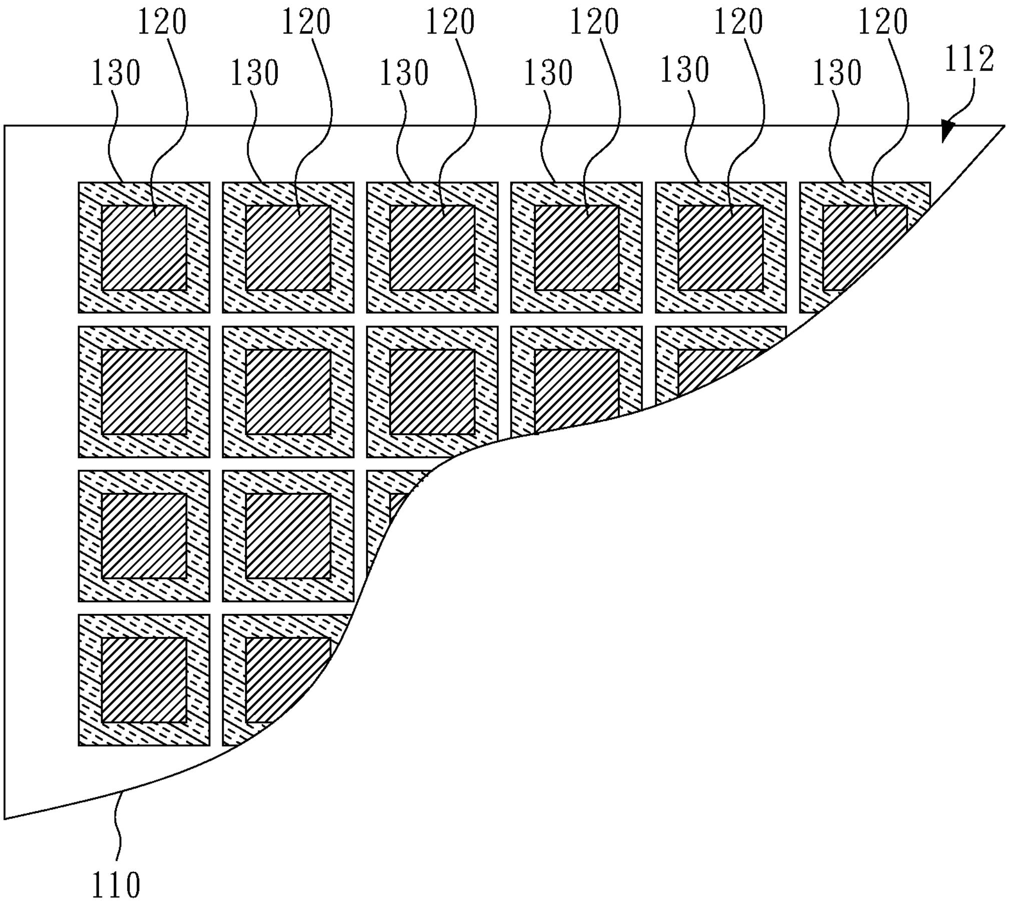
FIG. 5 is a top view of a semi-finished product of an optical device according to an embodiment of this disclosure, disclosing a lower transparent substrate, a glue-material enclosure wall, and a quantum dot film element.

As shown in FIG. 1, FIG. 4, and FIG. 5, the method is to then provide a quantum dot film element 120 and a glue-material enclosure wall 130 disposed on the upper surface 112, as shown in step S120. The glue-material enclosure wall 130 surrounds the quantum dot film element 120, allowing the glue-material enclosure wall 130 to cover the side surface of the quantum dot film element 120.

Specifically, step S120 may further include the following sub-steps.

As shown in FIG. 1, FIG. 2, and FIG. 3, the glue-material enclosure wall 130 is disposed on the upper surface 112 and the glue-material enclosure wall 130 is enabled to surround an accommodating region 132, as shown in step S122. The glue-material enclosure wall 130 is formed through application of a glue material onto the upper surface 112 along a closed path. The application may be spraying. In this case, the glue-material enclosure wall 130 may be heat cured to be shaped and therefore is not deformed due to the flow of the glue material. The glue material may be silicone resin, but does not exclude another resin glue material of high polymer.

As shown in FIG. 1, FIG. 4, and FIG. 5, next, a quantum dot glue is injected into the accommodating region 132 to form the quantum dot film element 120, as shown in step S124. The quantum dot glue may be a glue material including a photocurable glue and luminescent semiconductor nanoparticles. These luminescent semiconductor nanoparticles can be excited by lights to convert the wavelength of the lights, so as to enable the wavelength of the lights to match the expected light spectrum. For example, blue lights are adjusted as white lights.

Specifically, an application thickness (that is, the thickness of the quantum dot film element 120) of the quantum dot glue ranges from 20 μm to 200 μm. The quantum dot glue may be made of a glue material applied through dispensing or spraying, such as a mixture of a photocurable glue and nanoparticles.

Figure 6:
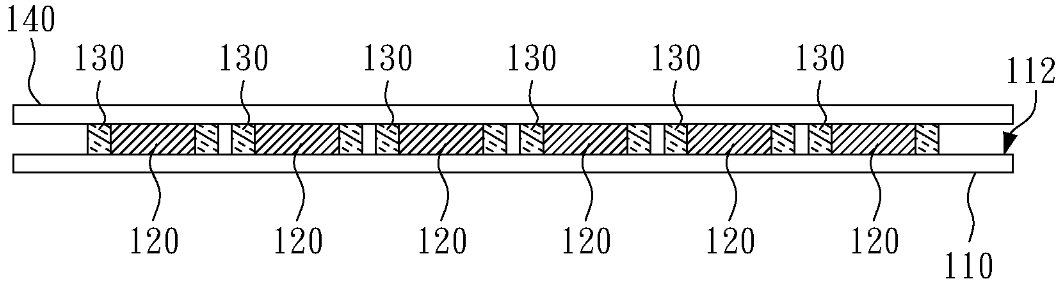
FIG. 6 is a schematic sectional view of a semi-finished product of an optical device according to an embodiment of this disclosure, disclosing a lower transparent substrate, a glue-material enclosure wall, a quantum dot film element, and an upper transparent substrate.
Figure 7:
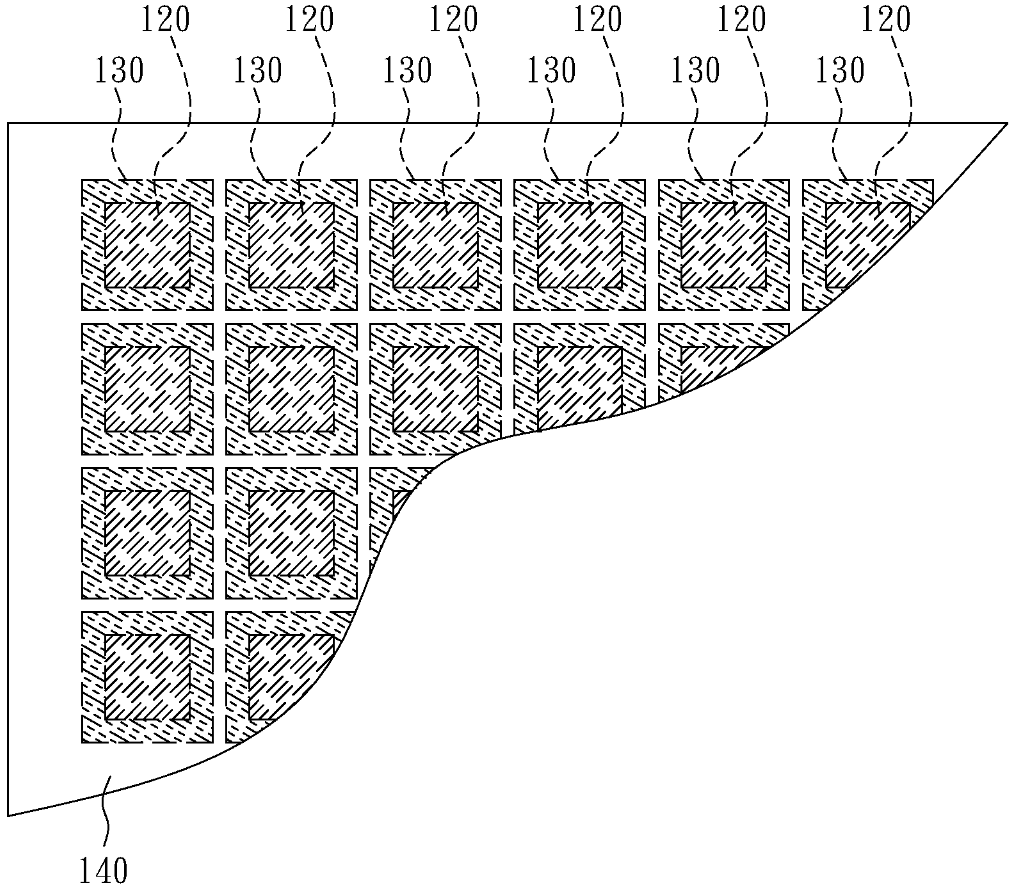
FIG. 7 is a top view of a semi-finished product of an optical device according to an embodiment of this disclosure, disclosing a glue-material enclosure wall, a quantum dot film element, and an upper transparent substrate.

As shown in FIG. 1, FIG. 6, and FIG. 7, an upper transparent substrate 140 is provided, covering the quantum dot film element 120 and the glue-material enclosure wall 130, such that the quantum dot film element 120 and the glue-material enclosure wall 130 are sandwiched between the lower transparent substrate 110 and the upper transparent substrate 140, as shown in step S130. In such process, the glue-material enclosure wall 130 may be heat cured for the second time, such that the glue-material enclosure wall 130 can adhere to the upper transparent substrate 140, ensuring that the lower transparent substrate 110 and the upper transparent substrate 140 are both joined to the glue-material enclosure wall 130. In addition, the glue-material enclosure wall 130 may further be thinned under pressure to change the gap between the lower transparent substrate 110 and the upper transparent substrate 140, allowing the quantum dot glue to fill the accommodating region 132 without a gap. Furthermore, the quantum dot glue is exposed to a UV light for photo-curing to shape the quantum dot film element 120 and join it to the lower transparent substrate 110 and the upper transparent substrate 140.

Figure 8:
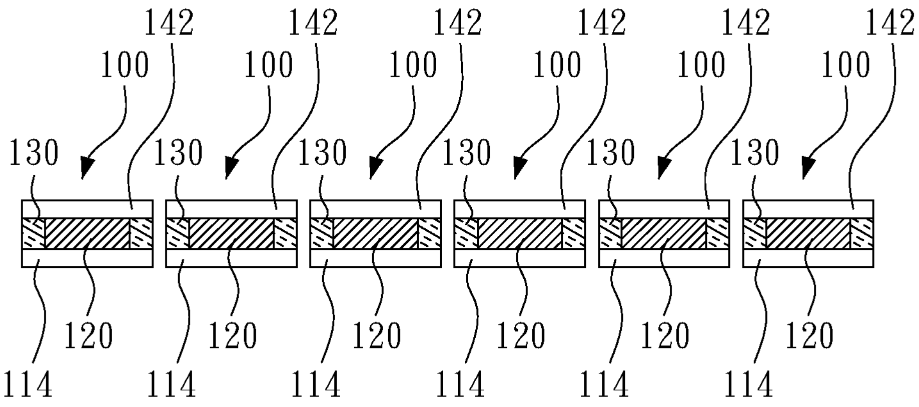
FIG. 8 is a schematic sectional view of a plurality of optical devices according to an embodiment of this disclosure, disclosing a lower transparent substrate, a glue-material enclosure wall, a quantum dot film element, and an upper transparent substrate.
Figure 9:
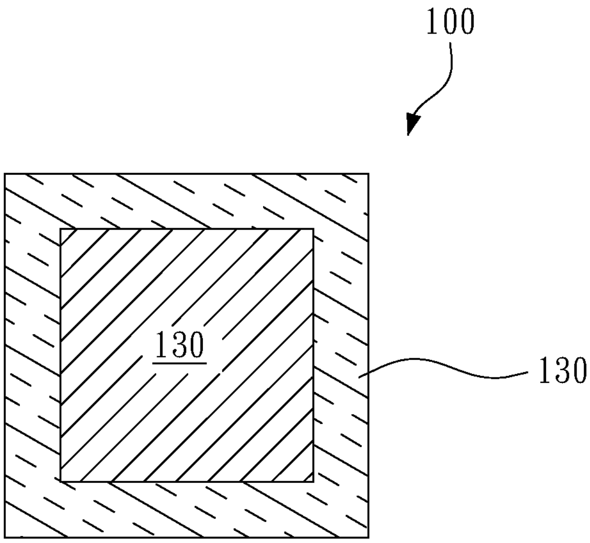
FIG. 9 is a top view of part of the optical device according to an embodiment of this disclosure, disclosing a glue-material enclosure wall and a quantum dot film element.

As shown in FIG. 1, FIG. 8, and FIG. 9, at last, the lower transparent substrate 110 and the upper transparent substrate 140 are cut to form a lower protective film 114 and an upper protective film 142 corresponding to the quantum dot film element 120. In other words, the lower transparent substrate 110 is cut into the lower protective film 114 carrying the quantum dot film element 120 and the glue-material enclosure wall 130, and the upper transparent substrate 140 is cut into the upper protective film 142 covering the quantum dot film element 120 and the glue-material enclosure wall 130, as shown in step S140. Ultimately, the optical device 100 including the lower protective film 114, the upper protective film 142, the quantum dot film element 120, and the glue-material enclosure wall 130 can be obtained. The foregoing process of cutting the lower transparent substrate 110 and the upper transparent substrate 140 may involve water jet cutting or laser cutting.

As shown in FIG. 8 and FIG. 9, based on the foregoing manufacturing method of the optical device 100, this disclosure provides an optical device 100 with quantum dots, including a lower protective film 114, a quantum dot film element 120, a glue-material enclosure wall 130, and an upper protective film 142.

As shown in FIG. 8 and FIG. 9, the lower protective film 114 and the upper protective film 142 may be glass substrates or made of other transparent materials. The quantum dot film element 120 and the glue-material enclosure wall 130 are disposed on the lower protective film 114. The glue-material enclosure wall 130 surrounds the quantum dot film element 120 and covers a side surface of the quantum dot film element 120. The upper protective film 142 covers the quantum dot film element 120 and the glue-material enclosure wall 130, such that the quantum dot film element 120 and the glue-material enclosure wall 130 are sandwiched between the lower protective film 114 and the upper protective film 142.

Based on the foregoing optical device 100 with quantum dots, the quantum dot film element 120 is completely sealed between the upper protective film 142, the glue-material enclosure wall 130, and the lower protective film 114. The quantum dot film element 120 is effectively isolated from water and air and not directly exposed to air, slowing down the material degradation of the quantum dot film element 120, thus increasing the service life of the optical device 100 with quantum dots.

In addition, the quantum dot film element 120 is surrounded by the glue-material enclosure wall 130 for protection. When the large glass substrates are cut into the lower protective film 114 and the upper protective film 142, the glue-material enclosure wall 130 can prevent the quantum dot film element 120 from being affected by cutting. For example, during cutting with a water jet, the glue-material enclosure wall 130 can prevent the quantum dot film element 120 from being damaged by water impact and prevent water from infiltrating the glue material of the quantum dot film element 120. For another example, during cutting with a laser, the glue-material enclosure wall 130 can prevent the quantum dot film element 120 from being heated by the laser.

The optical device 100 is configured to join a point light source, especially, a light-emitting diode unit 220, so as to adjust the light-emitting characteristics of the light-emitting diode unit 220.

Figure 10:
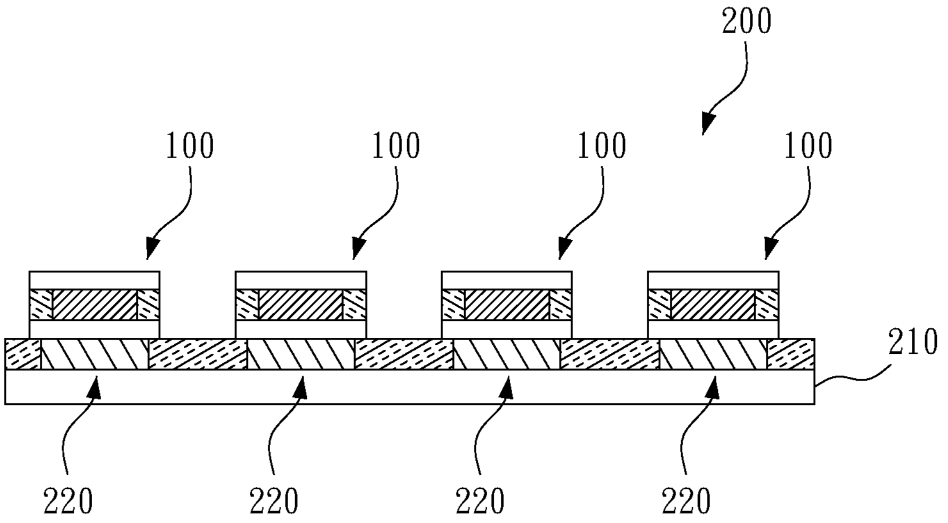
FIG. 10 is a schematic sectional view of a light-emitting apparatus in application example 1 according to an embodiment of this disclosure.
Figure 11:
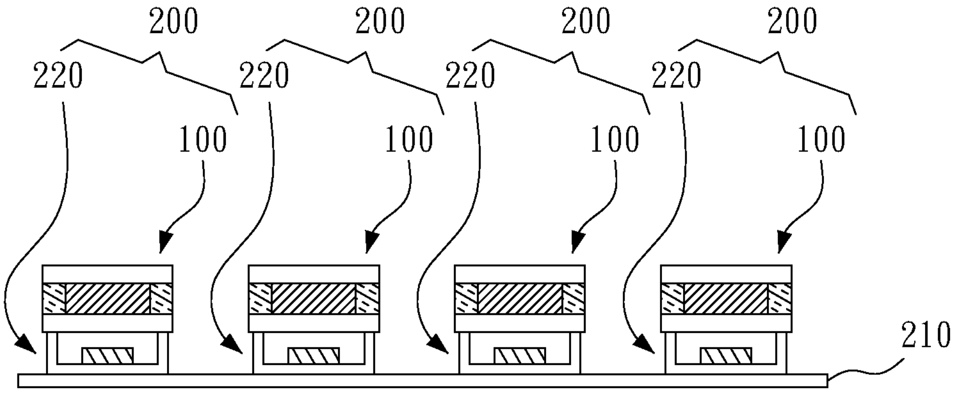
FIG. 11 is a schematic sectional view of a light-emitting apparatus in application example 2 according to an embodiment of this disclosure.

As shown in FIG. 10 or FIG. 11, based on the foregoing optical device 100, this disclosure provides a manufacturing method of a light-emitting apparatus 200 with quantum dots, including: providing one or more optical devices 100 manufactured using the foregoing method. Next, a carrier substrate 210 is provided and a light-emitting diode unit 220 is disposed on the carrier substrate 210. Ultimately, the optical device 100 is disposed on the light-emitting diode unit 220. The light-emitting diode unit 220 and the optical device 100 can be heat cured, allowing the transparent glue material 224 of the light-emitting diode unit 220 to join the light-emitting diode unit 220 to the optical device 100.

FIG. 10 and FIG. 11 respectively show application examples of a light-emitting diode unit 220 and a carrier substrate 210 in different forms.

FIG. 10 shows application example 1 of the light-emitting apparatus 200. In application example 1, the carrier substrate 210 is a backlight module substrate or a circuit substrate, and the light-emitting diode unit 220 includes at least one light-emitting diode chip 222, where the light-emitting diode chip 222 may be, but is not limited to a blue light LED. While the light-emitting diode chip 222 is fixedly disposed on the carrier substrate 210 through die-bonding operations such as surface adhesion and welding, a transparent glue material 224 is disposed around the light-emitting diode chip 222, to surround the light-emitting diode chip 222. In a case where the light-emitting apparatus 200 includes multiple light-emitting diode chips 222, the transparent glue material 224 fills a space between the light-emitting diode chips 222. When each optical device 100 is disposed on the corresponding light-emitting diode unit 220, at least a local portion of the lower protective film 114 of the optical device 100 is in contact with the transparent glue material 224. After the transparent glue material 224 is heat cured, the transparent glue material 224 can join each optical device 100 to the corresponding light-emitting diode unit 220, to obtain the light-emitting apparatus 200 including multiple light-emitting diode units 220. The quantum dot film element 120 and the light-emitting diode unit 220 are at least separated by a lower protective film 114. The lower protective film 114 allows for a large temperature difference between the surface of the light-emitting diode unit 220 and the quantum dot film element 120, thus preventing the lower surface of the quantum dot film element 120 from directly withstanding the high temperature of the light-emitting diode unit 220, and slowing down the degradation of the quantum dot film element 120 due to heat.

FIG. 11 shows application example 2 of the light-emitting apparatus 200, in which the light-emitting apparatus 200 includes a single light-emitting diode unit 220. The light-emitting diode unit 220 is temporarily disposed on the carrier substrate 210. In this case, the carrier substrate 210 may be a release film or a transfer board temporarily loading the light-emitting diode unit 220. After each optical device 100 is disposed on the corresponding light-emitting diode unit 220, each optical device 100 and the corresponding light-emitting diode unit 220 can be removed together to form a light-emitting apparatus 200 including a single light-emitting diode unit 220.

Figure 12:
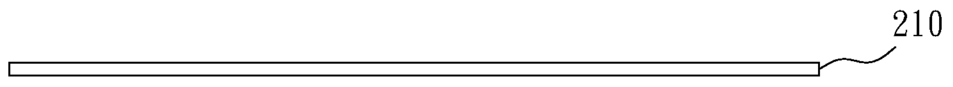
FIG. 12 to FIG. 14 are schematic sectional views of a semi-finished product of the light-emitting apparatus in application example 2 according to an embodiment of this disclosure, showing a manufacturing process of the light-emitting apparatus.
Figure 13:
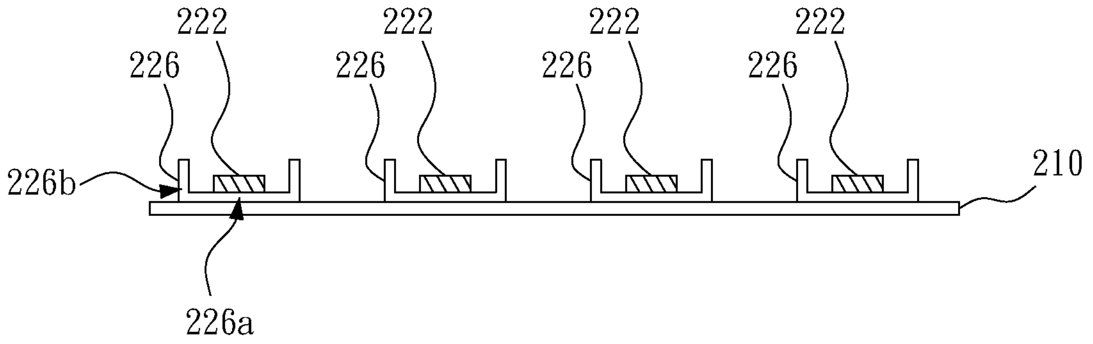
Figure 14:
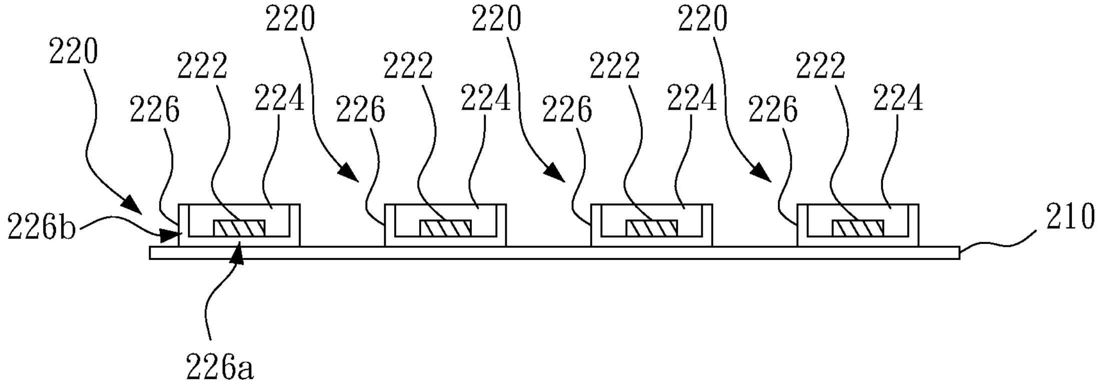

FIG. 12, FIG. 13, and FIG. 14 show a manufacturing process in application example 2.

As shown in FIG. 12, a carrier substrate 210 is provided, where the carrier substrate 210 may be a release film or a transfer board temporarily loading the light-emitting diode unit 220. The light-emitting diode unit 220 includes a bracket 226, a light-emitting diode chip 222, and a transparent glue material 224.

As shown in FIG. 13, one or more brackets 226 are then provided on the carrier substrate 210. The bracket 226 may be made of an organic material such as epoxy resin, or a metal material.

As shown in FIG. 13, the bracket 226 includes a bottom portion **226*a* and a side portion 226*b* extending at an edge of the bottom portion 226*a*. The side portion 226*b* may surround the bottom portion 226*a*, such that an accommodating space is formed between the bottom portion 226*a* and the side portion 226*b*. The bottom portion 226*a* is disposed on the carrier substrate 210**.

As shown in FIG. 13, a light-emitting diode chip 222 is provided. The light-emitting diode chip 222 is fixed to the bottom portion **226*a*, such that the light-emitting diode chip 222 is indirectly fixed to the carrier substrate 210 via the bracket 226**.

As shown in FIG. 14, a transparent glue material 224 is provided to fill the accommodating space of the bracket 226 and cover the light-emitting diode chip 222. Because the bottom portion **226*a* and the side portion 226*b* form a container with an accommodating space, the transparent glue material 224 can be disposed in the accommodating space through dispensing. During mass production of the light-emitting apparatus 200, multiple brackets 226 may be arrayed on the carrier substrate 210**. The dispensing operation may be performed using multiple arrayed dispensing nozzles simultaneously, while the transparent glue material

224 is sequentially injected into the multiple brackets 226, thus achieving the mass-production effect. At this moment, multiple light-emitting diode units 220 are manufactured.

As shown in FIG. 11, ultimately, each optical device 100 is disposed on each light-emitting diode unit 220, and at least a local portion of the lower protective film 114 of the optical device 100 is in contact with the transparent glue material 224. The transparent glue material 224 is heat cured. The transparent glue material 224 joins each optical device 100 to the corresponding light-emitting diode unit 220, to obtain multiple light-emitting apparatuses 200 each including a single light-emitting diode unit 220.

Figure 15:
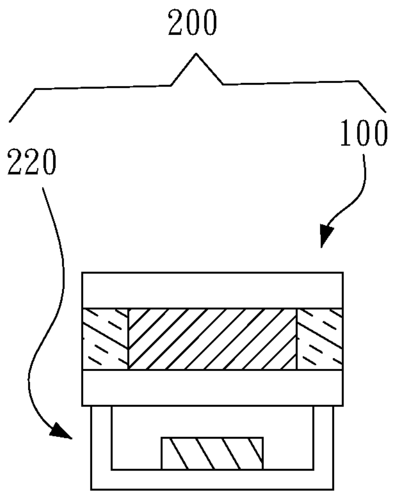
FIG. 15 is a schematic sectional view of a single light-emitting apparatus in application example 2 according to an embodiment of this disclosure.

As shown in FIG. 15, each light-emitting apparatus 200 can be individually removed from the carrier substrate 210 and transferred to a backlight module substrate (for example, a PCB or a glass) or another circuit board for die-bonding operations such as surface adhesion and welding.

In application example 2, the quantum dot film element 120 and the light-emitting diode unit 220 are at least separated by the lower protective film 114 and the transparent glue material 224. The lower protective film 114 and the transparent glue material 224 allow for a large temperature difference between the surface of the light-emitting diode chip 222 and the quantum dot film element 120, thus preventing the lower surface of the quantum dot film element 120 from directly withstanding the high temperature of the light-emitting diode chip 222, and more effectively slowing down the degradation of the quantum dot film element 120 due to heat.

Figure 16:
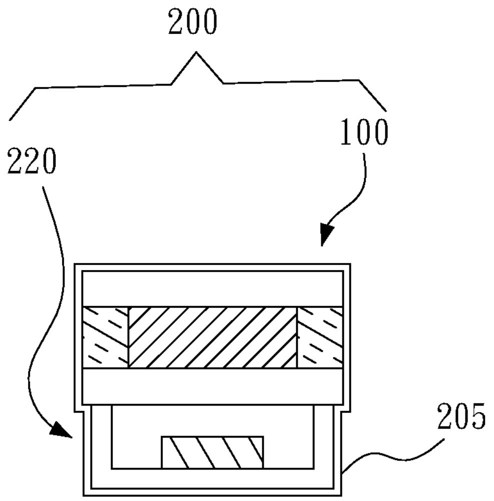
FIG. 16 is a schematic sectional view of another single light-emitting apparatus in application example 2 according to an embodiment of this disclosure.

As shown in FIG. 16, the light-emitting apparatus 200 in application example 2 may be further coated. For example, an inorganic material such as SiO2, TiO2, or Al2O3 is subjected to the atomic layer deposition (ALD) to form a protective coating 205, which covers the surface of the optical device 100 and the surface of the light-emitting diode unit 200. In addition, the thickness of the protective coating 205 ranges from 10 nm to 500 nm, to further isolate the entire light-emitting apparatus 200 from the external air.

According to the manufacturing method of an optical device 100, the optical device 100 with quantum dots, and the light-emitting apparatus 200 with quantum dots provided by this disclosure, the quantum dot film element 120 is completely covered between the upper protective film 142, the lower protective film 114, and the glue-material enclosure wall 130. The quantum dot film element 120 is isolated from the external air and not prone to adverse effect during cutting, slowing down the material degradation of the quantum dot film element 120, thus increasing the service life of the optical device 100 with quantum dots. In addition, the manufacturing method provided by this disclosure allows for the mass production of the optical device 100 and the light-emitting apparatus 200, maintaining the required production capacity.

What is claimed is:

1. A manufacturing method of an optical device, comprising:

providing a lower transparent substrate; wherein the lower transparent substrate includes an upper surface;

providing a glue-material enclosure wall, wherein the glue-material enclosure wall is disposed on the upper surface to surround an accommodating region and is heat cured to be shaped;

providing a quantum dot film element disposed in the accommodating region after the glue-material enclosure wall disposed on the upper surface; wherein the glue-material enclosure wall surrounds the quantum dot film element;

providing an upper transparent substrate covering the quantum dot film element and the glue-material enclosure wall, such that the quantum dot film element and the glue-material enclosure wall are sandwiched between the lower transparent substrate and the upper transparent substrate, wherein the glue-material enclosure wall is thinned under a pressure from the upper transparent substrate covering the quantum dot film element and the glue-material enclosure wall cause a thickness of the glue-material enclosure wall same as a thickness of the quantum dot film element, and the thickness of the quantum dot film element ranges from 20 μm to 200 μm;

heat curing the glue-material enclosure wall again after the upper transparent substrate covers the quantum dot film element and the glue-material enclosure wall; and cutting the lower transparent substrate and the upper transparent substrate to form a lower protective film and an upper protective film corresponding to the quantum dot film element, so as to obtain the optical device comprising the lower protective film, the upper protective film, the quantum dot film element, and the glue-material enclosure wall;

wherein, the optical device is contained in a protective coating.

2. The manufacturing method according to claim 1; wherein the step of disposing the glue-material enclosure wall comprises:

applying a glue material onto the upper surface along a closed path to form the glue-material enclosure wall.

3. The manufacturing method according to claim 1; wherein the step of disposing the quantum dot film element comprises:

injecting a quantum dot glue into the accommodating region, the quantum dot glue comprising a photocurable glue and luminescent semiconductor nanoparticles.

4. The manufacturing method according to claim 3, further comprising:

exposing the quantum dot glue to a UV light for photocuring.

5. The manufacturing method according to claim 1; wherein a method for cutting the lower transparent substrate and the upper transparent substrate is using water jet cutting or laser cutting.

6. An optical device with quantum dots, comprising:

a lower protective film;

a quantum dot film element disposed on the lower protective film;

a glue-material enclosure wall disposed on the lower protective film; wherein the glue-material enclosure wall surrounds the quantum dot film element and covers a side surface of the quantum dot film element; and an upper protective film covering the quantum dot film element and the glue-material enclosure wall, such that the quantum dot film element and the glue-material enclosure wall are sandwiched between the lower protective film and the upper protective film and a thickness of the glue-material enclosure wall same as a thickness of the quantum dot film element, wherein the thickness of the quantum dot film element ranges from 20 μm to 200 μm;

wherein, the optical device is contained in a protective coating;

wherein, the optical device is manufactured by a manufacturing method comprising:

providing a lower transparent substrate; wherein the lower transparent substrate includes an upper surface;

providing the glue-material enclosure wall, wherein the glue-material enclosure wall is disposed on the upper surface to surround an accommodating region and is heat cured to be shaped;

providing the quantum dot film element disposed in the accommodating region after the glue-material enclosure wall disposed on the upper surface;

providing a upper transparent substrate covering the quantum dot film element and the glue-material enclosure wall, such that the quantum dot film element and the glue-material enclosure wall are sandwiched between the lower transparent substrate and the upper transparent substrate, wherein the glue-material enclosure wall is thinned under a pressure from the upper transparent substrate covering the quantum dot film element and the glue-material enclosure wall cause the thickness of the glue-material enclosure wall same as the thickness of the quantum dot film element;

heat curing the glue-material enclosure wall again after the upper transparent substrate covers the quantum dot film element and the glue-material enclosure wall; and cutting the lower transparent substrate and the upper transparent substrate to form the lower protective film and the upper protective film corresponding to the quantum dot film element, so as to obtain the optical device.

7. The optical device with quantum dots according to claim 6; wherein a glue material forming the glue-material enclosure wall extends on the upper surface along a closed path.

8. The optical device with quantum dots according to claim 6; wherein the quantum dot film element comprises a photocurable glue and luminescent semiconductor nanoparticles.

9. An illumination apparatus with quantum dots, comprising:

a light-emitting diode unit comprising at least one light-emitting diode chip; and an optical device with quantum dots disposed on the light-emitting diode unit; wherein the optical device with quantum dots comprises:

a lower protective film;

a quantum dot film element disposed on the lower protective film;

a glue-material enclosure wall disposed on the lower protective film; wherein the glue-material enclosure wall surrounds the quantum dot film element and covers a side surface of the quantum dot film element; and an upper protective film covering the quantum dot film element and the glue-material enclosure wall, such that the quantum dot film element and the glue-material enclosure wall are sandwiched between the lower protective film and the upper protective film, a thickness of the glue-material enclosure wall same as a thickness of the quantum dot film element, wherein the thickness of the quantum dot film element ranges from 20 μm to 200 μm;

wherein, the illumination apparatus is contained in a protective coating;

wherein, the optical device is manufactured by a manufacturing method comprising:

providing a lower transparent substrate; wherein the lower transparent substrate includes an upper surface;

providing the glue-material enclosure wall, wherein the glue-material enclosure wall is disposed on the upper surface to surround an accommodating region and is heat cured to be shaped;

providing the quantum dot film element disposed in the accommodating region after the glue-material enclosure wall disposed on the upper surface;

providing a upper transparent substrate covering the quantum dot film element and the glue-material enclosure wall, such that the quantum dot film element and the glue-material enclosure wall are sandwiched between the lower transparent substrate and the upper transparent substrate, wherein the glue-material enclosure wall is thinned under a pressure from the upper transparent substrate covering the quantum dot film element and the glue-material enclosure wall cause the thickness of the glue-material enclosure wall same as the thickness of the quantum dot film element;

heat curing the glue-material enclosure wall again after the upper transparent substrate covers the quantum dot film element and the glue-material enclosure wall; and cutting the lower transparent substrate and the upper transparent substrate to form the lower protective film and the upper protective film corresponding to the quantum dot film element, so as to obtain the optical device.

10. The illumination apparatus with quantum dots according to claim 9, further comprising a carrier substrate; wherein the light-emitting diode unit is disposed on the carrier substrate.

11. The illumination apparatus with quantum dots according to claim 10, further comprising a transparent glue material surrounding the light-emitting diode chip; wherein at least a local portion of the lower protective film is in contact with the transparent glue material.

12. The illumination apparatus with quantum dots according to claim 9; wherein the light-emitting diode unit further comprises:

a bracket, comprising a bottom portion and a side portion extending at an edge of the bottom portion; wherein the side portion surrounds the bottom portion, such that the bottom portion and the side portion form an accommodating space, and the light-emitting diode chip is fixed to the bottom portion; and a transparent glue material filling the accommodating space of the bracket and covering the light-emitting diode chip; wherein at least a local portion of the lower protective film is in contact with the transparent glue material.

* * * * *